Figure 1:
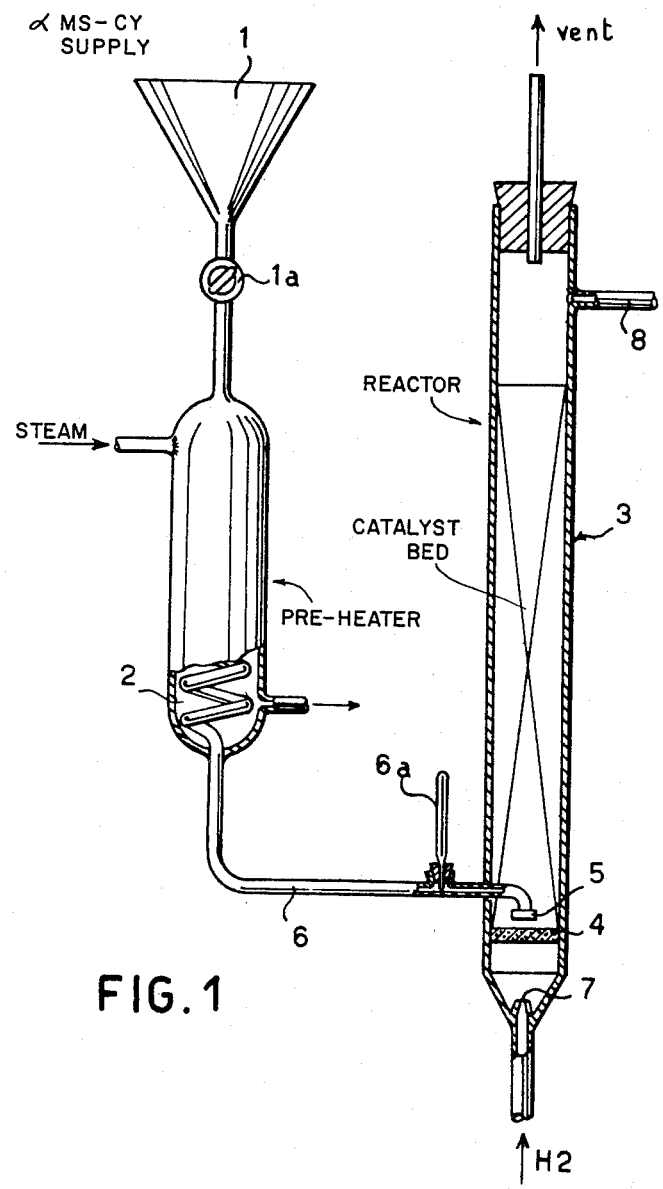

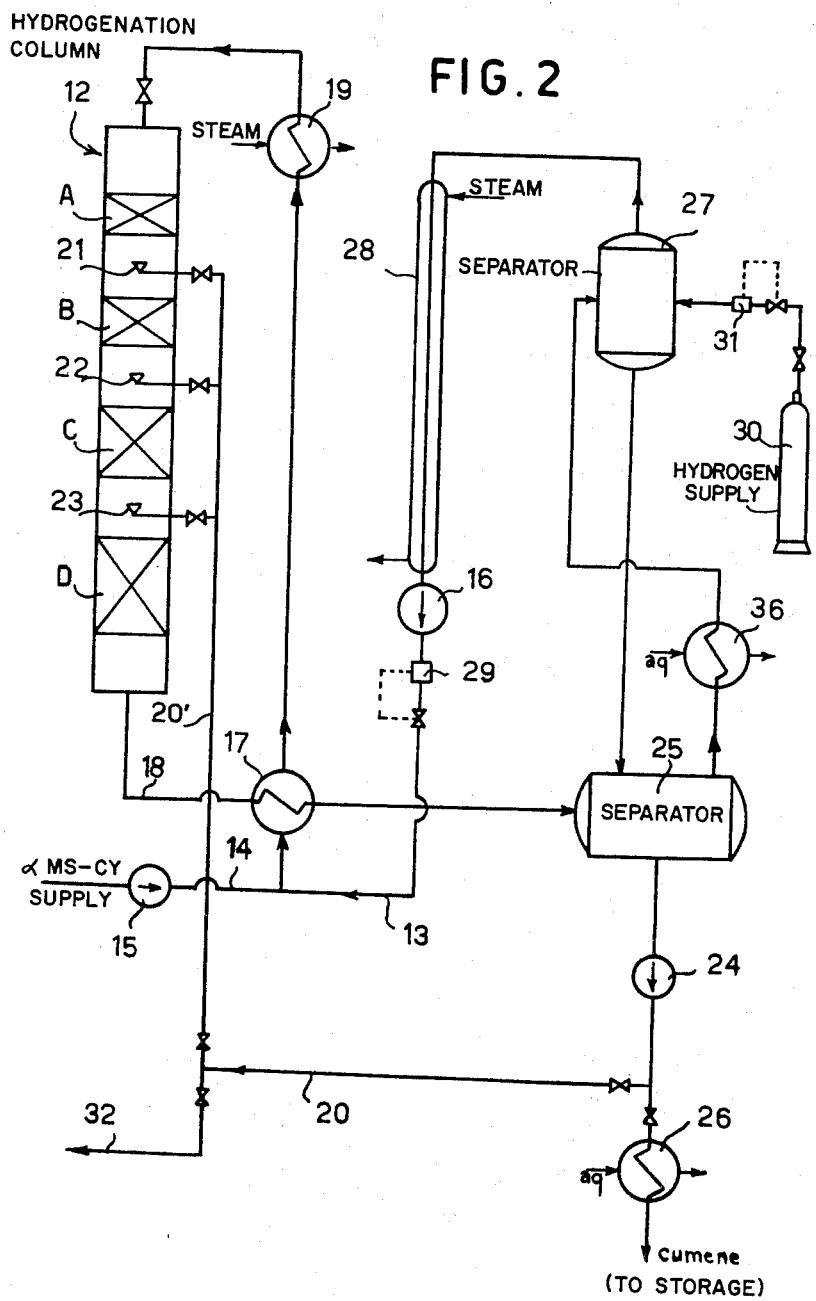

3,127,452
METHOD OF HYDROGENATING ALPHA-METHYLSTYRENE TO CUMENE
Franco Codignola, Milan, Italy, assignor to Società Italiana Resine, Milan, Italy
Filed Aug. 17, 1961, Ser. No. 132,174
Claims priority, application Italy June 7, 1961
7 Claims. (Cl. 260—667)

This invention concerns hydrogenation of alpha-methylstyrene to cumene, alpha-methylstyrene being mixed with cumene in a mixture resulting from fractional distillation of acidic decomposition products of cumene hydroperoxide to cumene.

Normally such hydrogenation is carried out in the presence of catalysts containing nickel or metals of nickel group at relatively high temperatures and pressures.

Catalysts of this type are, however, objectionable, in that they necessitate critical hydrogenation conditions; owing to the constant risk of hydrogenation of the nucleus in addition to the desired hydrogenation of the double link of the lateral chain.

It has now been found that by employing a catalyst comprising palladium adsorbed on granulated active carbon in a fixed bed arrangement, alhpa-methylstyrene can be continuously hydrogenated to cumene, the alpha-methylstyrene being mixed with cumene as obtained from the production of phenol and acetone from cumene.

With this method, alpha-methylstyrene can be readily and selectively converted to cumene; and operation can moreover be carried out at a relatively low temperature (70°–150° C.) and low pressure (room pressure to about 10 atm.). However, it is possible to operate even at temperatures from about 20° to about 200° C.

The adsorbed palladium percentage can range within very wide limits without affecting in any manner the course of reaction.

Such limits are determined exclusively by factors of an economical character for, on increasing beyond given values the adsorbed palladium quantity no advantage results in respect of conduct of the reaction, whereas the mechanical strength of the catalyst is reduced, thereby imparing its useful life.

Experiments carried out by applicant disclosed that optimum results both from a technical and an economical piont of view, are obtained by selecting an adsorbed palladium percentage within the range of 1 to 5% of the carbon weight. Applicant's experiments showed that a 2% palladium proportion is the optimum, taking into account technical-economical factors, such as useful life of the catalyst, contact time periods, etc.

In addition to its high selectivity the above mentioned catalyst is further advantageous in that it is unaffected by any impurities in the alpha-methylstyrene-cumene mixture resulting from distillation of the acidic decomposition mixture of cumene hydroperoxide, namely water, acetone, phenol, traces of oxidizing products, etc.

In addition to the catalysts manufactured by applicant's concern, the VA catalyst of Engelhard Ind. was found to be fully satisfactory for the purposes of this invention.

In order to facilitate understanding by experts of the examples given hereafter, it should be noted that the values indicated therein are obtained from hydrogenation carried out by means of the above mentioned VA catalyst distributed by Engelhard Ind.

The alpha-methylstyrene concentration in cumene may range within very wide limits; even pure alpha-methylstyrene will afford a normal reaction.

The mixtures from the acetone and phenol manufacturing plant by oxydation of cumene and subsequent acidic decomposition of the resulting hydroperoxide are normally of an alpha-methylstyrene concentration ranging between 1 and 20%.

On the accompanying drawings:
FIG. 1 shows diagrammatically a laboratory hydrogenation apparatus, and
FIG. 2 is a diagram of an industrial plant for carrying out this invention.

*Example 1.—Laboratory Hydrogenation (FIG. 1)*

A glass column 3 was employed of a bore of about 26 mm., 300 mm. in height, packed with granulated 2% palladized carbon of the VA type distributed by Engelhard Ind. to about 230 mm., the total catalyst volume being about 122 ccm.

A porous glass distributor 5 was arranged within the column directly above the catalyst supporting wire cloth 4 and connected with a piping 6 supplying the alpha-methylstyrene-cumene mixture. A nozzle 7 is provided on the column bottom for supplying hydrogen. The reacted product is withdrawn through an overflow 8, so that reaction actually takes place at atmospheric pressure increased merely by the drop in pressure due to the overlaying liquid column and catalyst mass. Excess hydrogen is discharged from the top of the column.

The hydrogenation equipment is completed by a feeder 1 for the mixture to be hydrogenated, having a cock 1a and a pre-heating coil 2 for said mixture, heated by steam or any other medium. The temperature at the column inlet is measured by means of a thermometer 6a interposed in the piping 6. The following tests were carried out in said equipment.

(1) 250 ccm./h. of a 5% alpha-methylstyrene mixture in cumene and about 10 normal liters hydrogen were supplied to the column. The temperature of the reactants at the inlet to the hydrogenation column was about 92° C.

(2) 139 ccm./h. of a 8.2% alpha-methylstyrene mixture in cumene and about 7.8 normal liters hydrogen were supplied. The temperature of the reactants at the inlet to the hydrogenation column was about 95° C.

(3) 87 ccm./h. of a 13.5% alpha-methylstyrene mixture in cumene and about 6.7 normal liters hydrogen were supplied. The temperature of the reactants at the inlet to the hydrogenation column was about 96.5° C.

Cumene obtained from the hydrogenation reaction was always of a bromine number lower than 0.1.

In all above tests the space-velocity of alpha-methylstyrene was 0.1 liter/h. per liter of catalyst.

*Example 2.—Industrial Hydrogenation (FIG. 2)*

The alpha-methylstyrene-cumene mixture to be hydrogenated is admitted to the top of a hydrogenation column 12 together with hydrogen; the piping 13 supplying hydrogen opens into a delivery pipe 14 of a centrifugal pump 15 connected to a reservoir of the raw product to be hydrogenated. The column 12 is about 6 meters high and 400 mm. in inner diameter. Hydrogenation takes place by circulation of excess hydrogen with respect to the consumed quantity. The hydrogen is circulated by a circulating pump 16.

The mixture of alpha-methylstyrene with hydrogen is preheated prior to supply to the column in a pre-heater 17 at the expense of the reacted product issuing from the bottom of the column through a piping 18, and is subsequently brought to the desired temperature in an exchanger 19 heated by steam.

Four layers A, B, C, D of palladized carbon are provided within the column, said palladized carbon being of the type described in Example 1, the layers being 600, 800, 1100 and 1400 mm. high, respectively, the catalyst being supported by suitable grids, its total volume being about 491 liters.

Injection nozzles 21, 22, 23 are arranged beneath the layers A, B and C, respectively, through which cold cumene acting as quenching liquid can be supplied, said cumene being derived from a delivery pipe 20, 21 of a centrifugal pump 24.

Cumene and excess hydrogen drawn at the bottom of the column and cooled in exchanger 17 are conveyed to a separator 25. The cumene separated in the separator 25 is conveyed by centrifugal pump 24 to stockage reservoir after further cooling in a heat exchanger 26.

The hydrogen set free in separator 25 is cooled in heat exchanger 36; any condensed cumene is separated in separator 27 and returned to the separator 25.

The delivery of the circulating pump 16 which draws hydrogen from separator 27 through a steam heater 28, is adjusted by means of a regulator 29 interposed in its delivery pipe. The heater 28 avoids condensation of any cumene vapours still present in the hydrogen flow drawn from the pump 16.

The reacted hydrogen is replaced by hydrogen from bottles such as 30 and admitted to the separator 27 through a pressure regulating arrangement 31.

At the start of the working cycle the uncompletely hydrogenated starting mixture is recycled to the raw product reservoir through a piping 32.

A typical feed for the plant as described above comprises 1,000 liters/hour of a 5% alpha-methylstyrene in cumene equalling a bromine number of about 135.5. For hydrogenating said mixture 180 normal cbm./h. hydrogen are circulated, the consumed hydrogen being about 8 normal cbm./h.

The hydrogenation reaction of alpha-methylstyrene to cumene takes place at a temperature of about 130° C. and a pressure of about 3 atm. gauge.

By operating under the above conditions alpha-methylstyrene is practically wholly converted to cumene.

What I claim is:
1. The process of hydrogenating alpha-methylstyrene to cumene, wherein elemental hydrogen and a solution of alpha-methylstyrene in cumene are simultaneously led in mutual contact through a bed of a catalyst consisting of palladium metal adsorbed on granulated active carbon.

2. The process of hydrogenating alpha-methylstyrene to cumene, wherein elemental hydrogen and a solution of alpha-methylstyrene in cumene are simultaneously led in mutual contact through a bed of catalyst consisting of palladium metal adsorbed on granulated active carbon in a proportion from 1% to 5% by weight palladium based on said carbon.

3. The process of hydrogenating alpha-methylstyrene to cumene, wherein elemental hydrogen and a solution of alpha-methylstyrene in cumene are simultaneously led in mutual contact at a temperature from 20° to 200° C. and at an absolute pressure from 1 to about 10 atm. through a bed of a catalyst consisting of palladium metal adsorbed on granulated active carbon.

4. The process of hydrogenating alpha-methylstyrene to cumene, wherein elemental hydrogen and a solution of alpha-methylstyrene in cumene are simultaneously led in mutual contact at a temperature from 20° to 200° C. and at an absolute pressure from 1 to about 10 atm. through a bed of a catalyst consisting of palladium metal adsorbed on granulated active carbon in a proportion from 1% to 5% by weight palladium based on said carbon.

5. The process of hydrogenating alpha-methylstyrene to cumene, wherein elemental hydrogen and a solution of alpha-methylstyrene in cumene are concurrently led in mutual contact through a succession of catalyst beds the lengths of said catalyst beds progressively increasing in the direction of flow of the hydrogenation reactants, each of said catalyst beds comprising a catalyst consisting of palladium metal adsorbed on granulated active carbon, and wherein cooled hydrogenation product is supplied to said flow at locations between said beds thereby to absorb reaction heat.

6. The process of hydrogenating alpha-methylstyrene to cumene, wherein elemental hydrogen and a solution of alpha-methylstyrene in cumene are concurrently led in mutual contact at a temperature from 20° to 200° C. and at an absolute pressure from 1 to about 10 atm. through a succession of catalyst beds, the lengths of said catalyst beds progressively increasing in the direction of flow of the hydrogenation reactants and each of said catalyst beds comprising a catalyst consisting of palladium metal adsorbed on granulated active carbon, and wherein cooled hydrogenation product is supplied to said flow at locations between said catalyst beads thereby to absorb reaction heat.

7. The process of hydrogenating alpha-methylstyrene to cumene, wherein elemental hydrogen and a solution of alpha-methylstyrene in cumene are concurrently led in mutual contact at a temperature from 20° to 200° C. and at an absolute pressure from 1 to about 10 atm. through a succession of catalyst beds, the lengths of said catalyst beds progressively increasing in the direction of flow of the hydrogenation reactants and each of said catalyst beds comprising a catalyst consisting of palladium metal adsorbed on granulated active carbon in a proportion from 1 to 5% by weight palladium based on said carbon, and wherein cooled hydrogenation product is supplied to said flow at locations between said catalyst beds thereby to absorb reaction heat.

References Cited in the file of this patent

UNITED STATES PATENTS

| | | |
|---|---|---|
| 2,623,078 | Bewley et al. | Dec. 23, 1952 |
| 2,721,226 | Ciapetta et al. | Oct. 18, 1955 |
| 2,734,921 | Bewley et al. | Feb. 14, 1956 |
| 2,749,359 | Calkins et al. | June 5, 1956 |
| 2,867,628 | Cass | Jan. 6, 1959 |
| 3,022,359 | Wiese et al. | Feb. 20, 1962 |